United States Patent [19]

Queen

[11] Patent Number: 4,573,930
[45] Date of Patent: Mar. 4, 1986

[54] STEERING MECHANISMS FOR OUTBOARD MOTOR

[76] Inventor: Charles L. Queen, 2243 S. Highland Dr., Camano Island, Wash. 98292

[21] Appl. No.: 376,152

[22] Filed: May 10, 1982

Related U.S. Application Data

[63] Continuation-in-part of Ser. No. 339,612, Jan. 15, 1982, abandoned, which is a continuation of Ser. No. 67,806, Aug. 20, 1979, Pat. No. 4,311,471.

[51] Int. Cl.⁴ ............................................. B63H 21/26
[52] U.S. Cl. ........................................ 440/56; 440/63; 403/235; 74/584
[58] Field of Search ...................... 440/55, 56, 63, 65; 403/108, 328, 234, 235, 191; 74/584, 586

[56] References Cited

U.S. PATENT DOCUMENTS

| | | | |
|---|---|---|---|
| 136,690 | 3/1873 | Aufdembrinle | 74/584 |
| 2,235,587 | 3/1941 | Peebles | 403/235 |
| 2,703,216 | 3/1955 | Petersen | 403/191 |
| 2,764,118 | 9/1956 | Madison | 114/253 |
| 2,884,265 | 4/1959 | Boughton | 403/234 |
| 3,756,186 | 9/1973 | Nordling | 440/63 |
| 4,009,678 | 3/1977 | North | 114/144 R |
| 4,033,530 | 7/1977 | Harris | 440/56 |

FOREIGN PATENT DOCUMENTS 921875  3/1963  United Kingdom ................. 74/584

Primary Examiner—Galen L. Barefoot
Assistant Examiner—Thomas J. Brahan
Attorney, Agent, or Firm—Hughes, Barnard & Cassidy

[57] ABSTRACT

A remote steering device, adapted for attachment to a main propulsion unit and an auxiliary outboard motor secured to the transom of a boat in order to slave steering movement of the outboard motor to that of the main propulsion unit irrespective of the attitude of the units, which device includes first and second brackets associated with the two propulsion units joined by a connecting rod at ball joints providing three degrees of motion and wherein the connecting rod includes at least two rod members secured at a releasable rotatable joint automatically adjustable in incremental steps in response to longitudinal forces; whereby all twisting forces are resolved at or through the rotational joint and cooperative ball joints and all longitudinal forces are resolved through automatic incremental adjustment of the length of the connecting rod.

11 Claims, 14 Drawing Figures

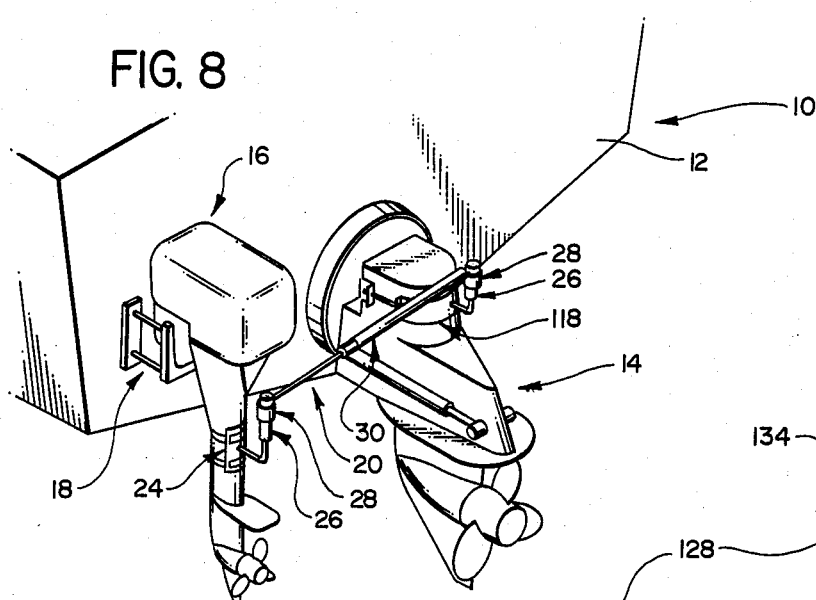
FIG. 8
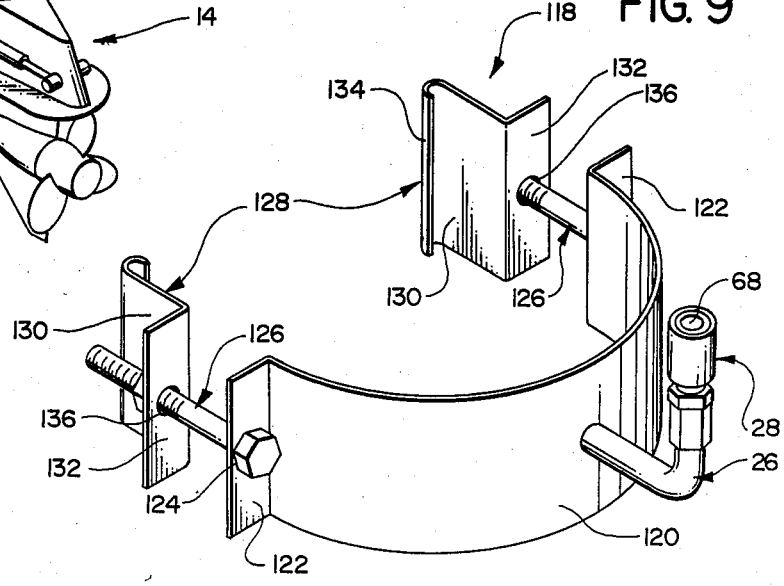
FIG. 9
FIG. 10
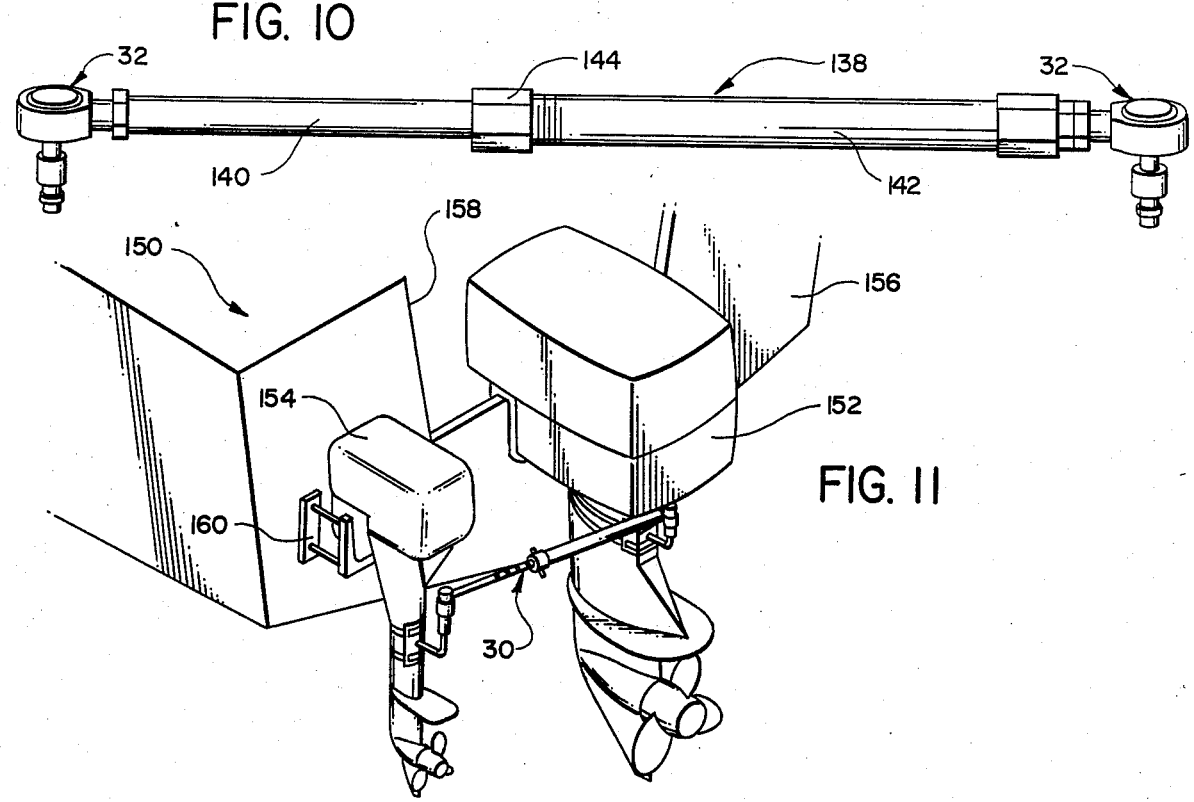
FIG. 11

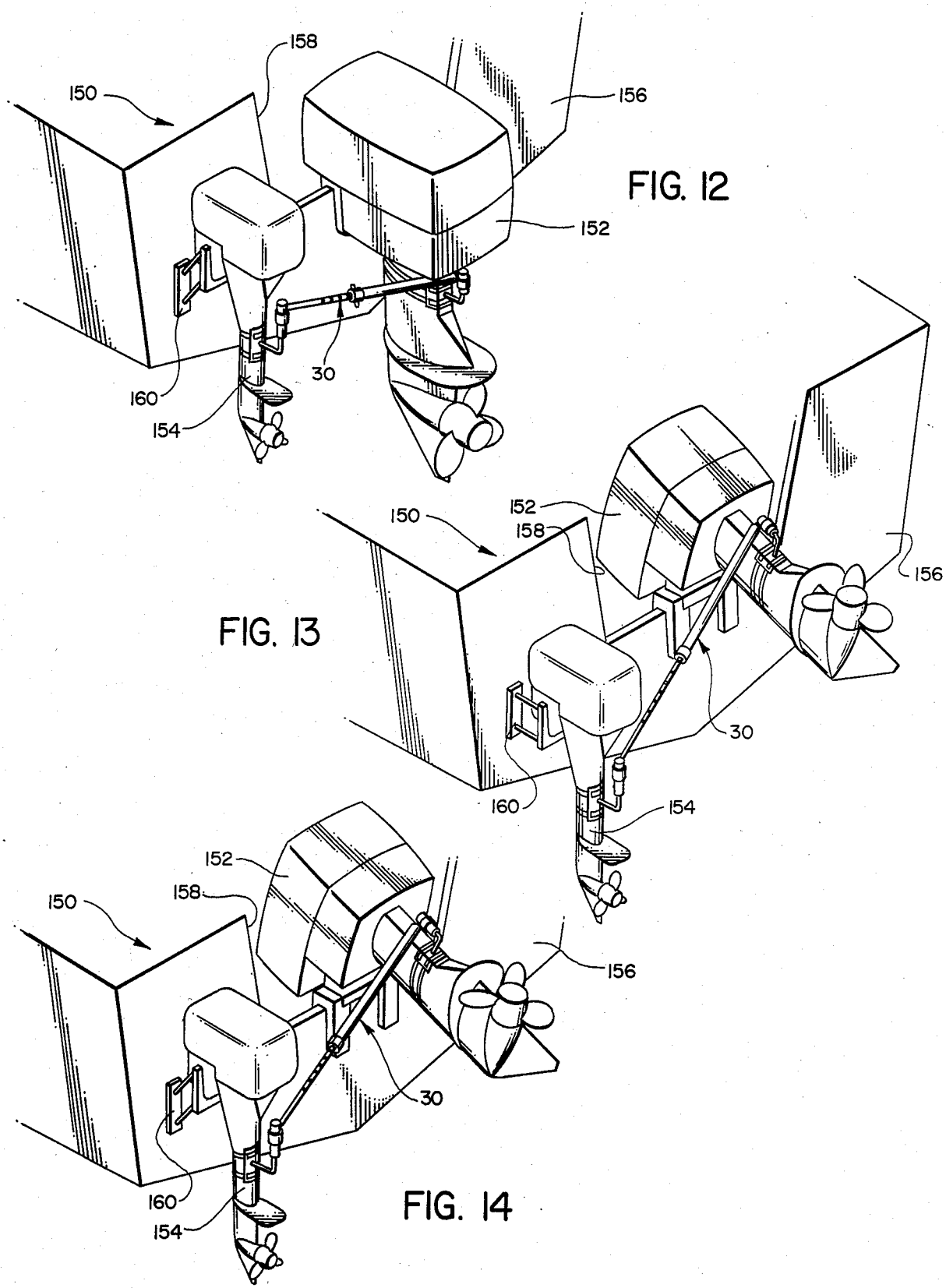

STEERING MECHANISMS FOR OUTBOARD MOTOR

CROSS REFERENCE TO RELATED PATENT

The present invention is an improvement over that disclosed and claimed in my earlier U.S. Pat. No. 4,311,471; and a continuation-in-part of my copending application Ser. No. 339,612 filed Jan. 15, 1982, now abandoned, which is a continuation of 67,806 filed 8-2-0-79 now U.S. Pat. No. 4,311,471 which are expressly incorporated herein by reference and relied upon.

BACKGROUND OF THE INVENTION

In my earlier U.S. Pat. No. 4,311,471, I disclose and claim a steering mechanism for slaving the steering movement imparted to an outdrive motor to an auxiliary outboard; both of which are associated in operative engagement with the transom of a boat. As set forth in greater detail in that patent, the use of a small auxiliary outboard motor on a boat equipped with a more powerful main propulsion unit has become rather commonplace; for example, to operate the auxiliary unit at low speed for trolling for fish. While the auxiliary provides a very convenient way for operating the boat at low speed, it nonetheless presents some difficulties to the operator as it is typically either inaccessible altogether or accessible for steerage only at great inconvenience. The invention of my aforesaid patent overcomes those problems by permitting the operator to steer the auxiliary from the normal position within the cockpit of a boat employed for steerage of the main propulsion unit for the craft.

Devices which permit an auxiliary engine to be controlled from a primary engine are well known in the prior art. U.S. Pat. No. 3,756,186 to Nordling illustrates an attachment which permits an outboard motor to be steered from a stern drive unit. The connecting mechanism includes a pair of telescopic members, each of which is connected through a universal joint to the outboard motor or the stern drive unit. A locking mechanism in the form of a pin extending through openings in both telescopic members is utilized to lock the telescopic members in any desired position depending upon the distance between the stern drive unit and the outboard motor. U.S. Pat. No. 3,567,164 to Hakala shows a support means which permits two outboard motors to be pivotally mounted thereto, so that an auxiliary outboard motor may be conveniently moved to a selected vertical position in water. U.S. Pat. Nos. 3,283,738 to Nelson, 2,968,192 to Fletcher, 2,899,833 to Prier, and 2,744,418 to Weber, all illustrate coupling or steering devices which permit a pair of outboard motors to be steered at the same time. U.S. Pat. No. 2,972,976 to Smith illustrates yet another device which permits a pair of stern drive units to be operated concurrently, or a single unit to be operated while the other is tilted or raised out of the water. Other patented approaches to achieve these aims are mentioned in my aforesaid U.S. patent, to which reference is made for further citations.

Notwithstanding the previous activity in this field, the need still exists to provide an improved type of steering mechanism for the auxiliary outboard and, particularly, one which accommodates not only twisting forces but longitudinal tensional or compressional forces as well.

SUMMARY OF THE INVENTION

The present invention advantageously provides an improved steering mechanism for an outboard auxiliary motor which accommodates not only twisting but any excessive longitudinal forces existing in the mechanism. The present invention is also desirable for providing improved types of fixture members which serve as brackets to associate the steering mechanism with the tandom propulsion units.

These and other advantages of the present invention are realized in a remote steering device adapted for use in a boat comprising: (i) a main propulsion unit in operative engagement with the transom of a boat for rotation about a first axis between a first, lower operating position and a second, upper non-operating position, the main propulsion unit being steerable from a cockpit portion of a boat, and (ii) an auxiliary outboard motor mounted externally of the boat to the transom for rotation about a second axis between a first, lower operating position and a second, upper non-operating position; the remote steering device being adapted for slaving attachment of the auxiliary outboard motor to the main unit in order to steer the auxiliary from the cockpit by steering the main unit and comprising bracket members adapted to be mounted to each of the main and auxiliary propulsion units; first and second ball joints connected to a respective one of the brackets wherein the ball joints include a ball joint housing and a ball joint member mounted therein for rotation about three axes mutually perpendicular with respect to one another; and an automatically adjustable connecting rod disposed intermediate the ball joints for slaving attachment of the auxiliary outboard motor to the main propulsion unit, the connecting rod comprising first and second telescoped rod members secured by a releasable rotatable joint comprising biased locking means for permitting automatic, incremental length adjustment of the connecting rod means upon the application of a longitudinal force along the connecting rod in excess of the locking force at the joint. By appropriate design of the connecting rod, the rotatable joint in combination with the ball joints accommodate the twisting forces associated with steerage while the rotatable joint itself permits incremental longitudinal adjustment when a longitudinal tensional or compressive force exceeds the locking force provided by the biasing means. In that event, the connecting rod length may be made longer or shorter automatically to account for such forces; thereby providing a measure of safety and added convenience in the coupling of the two propulsion units.

In a preferred form of the present invention, the rotatable joint is comprised of a series of spaced, circumferential grooves in a first of the rod members constituting the overall connecting rod and a biased joint pin means in the second of those rod members for biased insertion within a selected one of the grooves. When a longitudinal force on the connecting rod (resolved in the radial direction) exceeds the biasing force, the pin is forced from engagement with the preselected groove against the force of the biasing means, and the first rod telescopes within the second rod to present the next successive circumferential groove. If that amount of adjustment is sufficient, then the pin will be forced into biased locking engagement within that groove and maintain the length of the connecting rod at that new dimension. If, on the other hand, further adjustment is necessary, then a second sequential incremental adjustment will be made in a like manner.

In another aspect of the present invention, the bracket means are designed to cooperate efficiently with both the main propulsion unit and the auxiliary. The bracket for the main propulsion unit, when the same is an outdrive unit, includes a channel member for direct affixation to the engine and an upstanding post means terminating in a "quick-release" fitting for receiving the ball joint. In one form, the channel means is a unitary piece and in another form includes an adjustable collar. A bracket is also designed for affixation to an outboard motor drive which, within the context of the present invention is the form for the auxiliary in every case and optionally for the main propulsion unit itself. The bracket for an outboard motor is comprised of a first deformable web in the general shape of a "V" having a reinforcement web at the apex thereof. Two or more adjustable bands secure the bracket to the drive shaft area of the outboard motor such that the deformable web mates in close cooperation therewith and the reinforcement member serves as a secure place to support an upstanding post means terminating in the same type of "quick-release" fitting for receipt of associated ball joint.

Other advantages of the present invention, and a fuller appreciation of its mode of construction and operation, will be gained upon an examination of the following detailed description of preferred embodiments, taken in conjunction with the figures of drawing, wherein:

BRIEF DESCRIPTION OF THE DRAWINGS

FIG. 8 is a view similar to FIG. 1 showing a steering mechanism employing yet another type of bracket means;

FIG. 9 is an isometric view of the bracket means associated with the outdrive in FIG. 8;

FIG. 10 is a side elevational view of an alternate type of connecting rod, which is the design employed in the steering mechanism disclosed in my U.S. Pat. No. 4,311,471;

FIG. 11 is an isometric view similar to FIG. 8, but showing an outboard motor as the main propulsion unit for the boat, wherein both the main and auxiliary units are in a lowered, operating position;

FIG. 12 is a view similar to FIG. 11, but showing the auxiliary in an upper, non-operating position while the main unit is in its lower, operating position;

FIG. 13 shows an alternate situation, where the auxiliary is in its lowered position and the main unit in its upper position; and, FIG. 14 shows yet another alternate configuration where both units are in the upper, non-operating positions.

DETAILED DESCRIPTION OF THE INVENTION

The present invention relates, generally, to improved steering mechanisms for slaving the steerage of an auxiliary outboard motor to that of the main propulsion unit of a boat, whether that main unit be an outdrive or an outboard motor itself. Accordingly, the present invention will now be described with reference to certain preferred embodiments within the foregoing context, although, those skilled in the art will appreciate that such a description is meant to be exemplary and not limitative.

Figure 1:
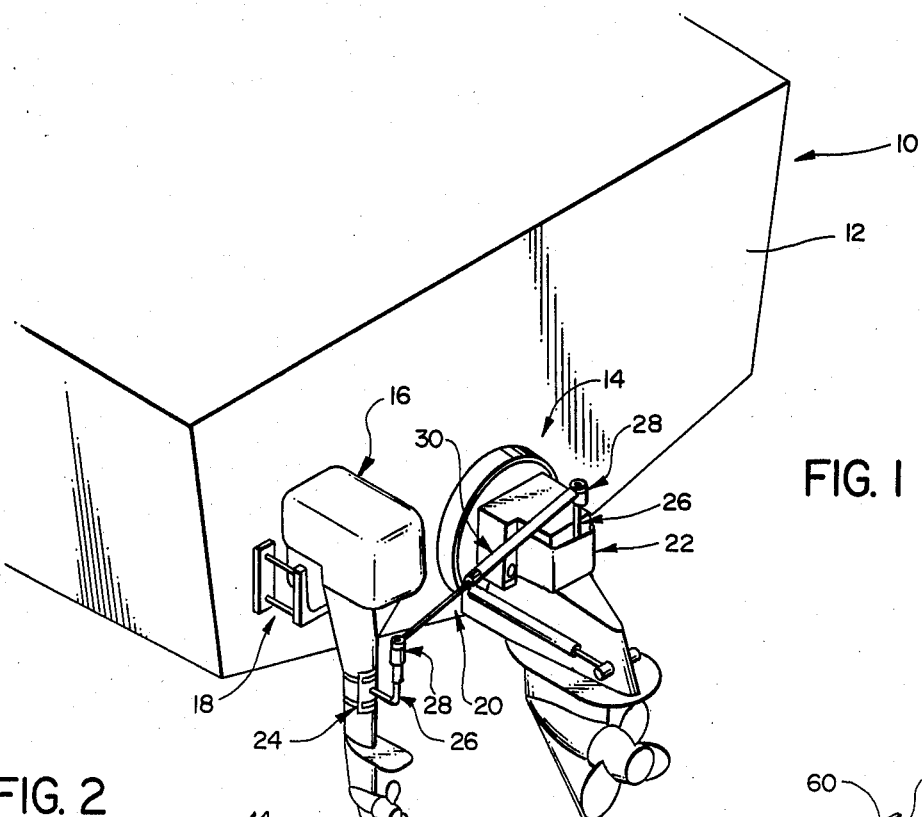
FIG. 1 is an isometric view of the transom of a boat showing an outdrive engine and auxiliary outboard motor slaved for cooperative steerage by means of an improved steering mechanism in accordance with the present invention.

Turning to the figures of drawing, in all of which like parts are identified with like reference numerals, FIG. 1 shows the stern of a boat, designated generally as 10, with a transom 12 having associated therewith a main propulsion unit designated 14, in the form of an outdrive, and an auxiliary outboard motor designated generally as 16. The outdrive, as is conventional, passes through the transom 12, receiving its power from an internal combustion engine located within the boat 10 (not shown) along with a means of steerage therefor such as a wheel (not shown). The auxiliary outboard 16 is secured to the transom 12 by means of a pivotal bracket 18 affixed to the transom in any convenient way. The main unit 14 and auxiliary 16 are slaved by means of an improved steering mechanism in accordance with the present invention, designated generally as 20. As is generally conventional, the main propulsion unit 14 is capable of rotation about a first axis between a first, lower operating position, as shown in FIG. 1, and a second upper non-operating position. Likewise, the auxiliary outboard motor 16 is mounted to be rotatable about a second axis between a first, lower operating position and a second upper non-operating position. Consequently, the steering mechanism 20 must accommodate both twisting forces as the two drive units are pivoted, oftentimes independently, and as the steerage of the main unit 14 is translated to steerage of the auxiliary unit 16. Additionally, the steering mechanism 20 must accommodate certain longitudinal forces, whether the same be in tension or compression, as might be experienced during steerage as well as manipulation of the two units about their pivotal axes.

The steering mechanism 20 is generally comprised of a bracket 22 securely affixed to the outdrive 14 and a bracket 24 affixed to the auxiliary 16. Each bracket includes an upstanding post designated generally as 26 terminating in a so-called "quick release" fitting designated generally as 28. A connecting rod designated generally as 30 spans the two brackets 22 and 24, secured thereto by means of ball joint connectors designated generally as 32 which permit for rotation of the connecting rod 30 about three axes mutually perpendicular to one another.

Figure 2:
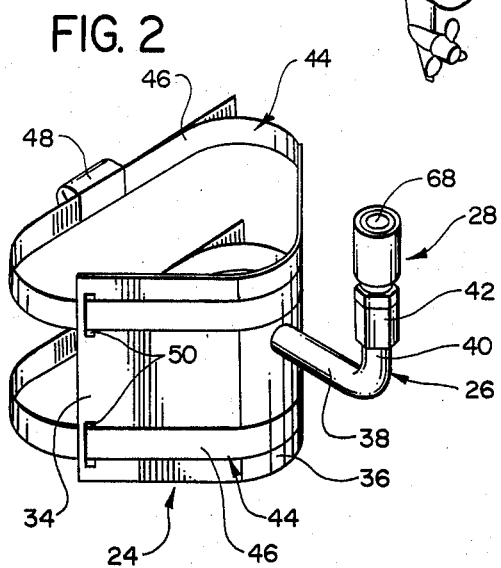
FIG. 2 is an isometric view of a preferred form of bracket for association with an outboard motor.

FIG. 2 illustrates the details of the bracket 24 associated with the outboard engine 16. In this preferred form, the bracket 26 is comprised of a first generally rectangular web 34 in the general configuration of a "V" with a rather soft or rounded apex. The web 34 is preferably one fabricated from a resiliently deformable material, such as a thin sheet of metal. A stiffening web 36 is secured to the deformable web 34 at the apex region of the "V". The rounded, reinforced apex of this embodiment is preferred in order to avoid sharp corners which would give rise to fatigue weakening of the bracket. The stiffening web, as the name implies, is present to rigidify that apex region, from which the upstanding post means 26 projects. In this preferred form, post means 26 is comprised of a first leg segment 38 bent to a second leg segment 40 which terminates at a collar 42 secured to the quick release fitting 28, described more fully below. The bracket 24 is affixed to the drive shaft region of the engine 16 by means of first and second adjustable band means 44, which are of conventional design and include straps 46 and associated adjustment lug collars 48. These adjustable band means 44 are formed in a type of endless loop where a first end of the strap is secured to a lug collar 48 and the second end passes through a slot in that collar in operative engagement with the threads of an adjustment screw. Manipulation of the adjustment screw will tend to tighten the respective strap thereby providing the adjustable feature for these bands. For the sake of convenience, the distal ends of each leg comprising the "V" of the deformable web 34 include slots 50 through which the bands pass for retaining the bracket on the shaft area of the engine 16. When the adjustable band means are tightened about that region, the deformable web 34 will wrap itself about the drive shaft in very secure engagement therewith, presenting the upstanding post means 26 and associated quick release fitting 28 for cooperation with the connecting rod 30, as described below.

Figure 3:
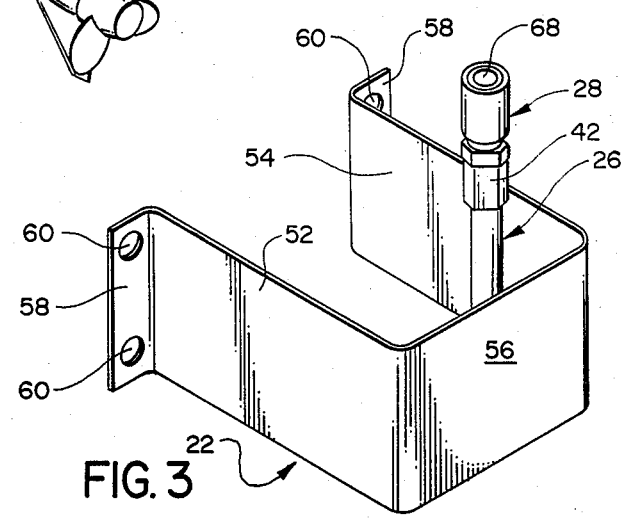
FIG. 3 is an isometric view of one form of a preferred bracket for an outdrive engine.
Figure 4:
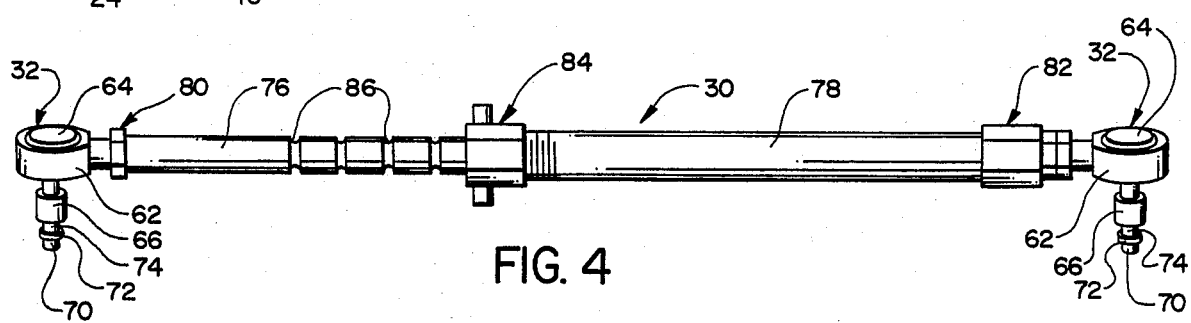
FIG. 4 is a side elevational view of a preferred connecting rod used in the improved steering mechanism of the present invention.

The bracket 22 associated with outdrive 14 is shown in detail in FIG. 3. In this variant, the bracket is in a generally "U"-shaped configuration having first and second legs 52 and 54, respectively, joined by a bridge leg 56. Each of the first and second legs terminates in an outwardly flared lip 58 having mounting holes 60 formed therein. Thus, the bracket 24 may be secured directly to the outdrive by insertion of fixture bolts through the mounting holes 60. In this form, the upstanding post 26 is comprised of but a single, generally vertical leg having the same type of collar 42 and quick release fitting 28 as associated with the post on bracket 24.

The connecting rod 30 spans the two brackets 22 and 24 securing the same in order to slave steerage of the auxiliary propulsion unit 16 to steerage of the main unit 14 from the cockpit area of the craft 10. The connecting rod 30 terminates at either end in the ball joint means 32; each of which is comprised of a ball joint housing 62 receiving a ball member 64 mounted therein. Each of the ball members 64 terminates in a downwardly depending fixture post 66 for insertion within the quick release fittings 28 associated with each of the brackets. More specifically, and as is generally conventional with this type of fitting, the quick release fittings 28 include axially reciprocable collars which control ball detents within a fixture channel, designated generally as 68. The fixture post means 66 terminate in a pin 70 having a circumferential flange 72 defining a detent receiving groove 74. When the fixture post 66 is projected within the fixture channel 68 and the sleeve retracted, the internal ball detents are relaxed to permit passage of the flange 72 and, upon release of those sleeves, the ball detents project within the groove 74 restraining the post within the channel. Thus, at each of the bracket means 22 and 24, the ball joints 32 allow for rotation of the connecting rod 30 about three mutually perpendicular axes.

Figure 5:
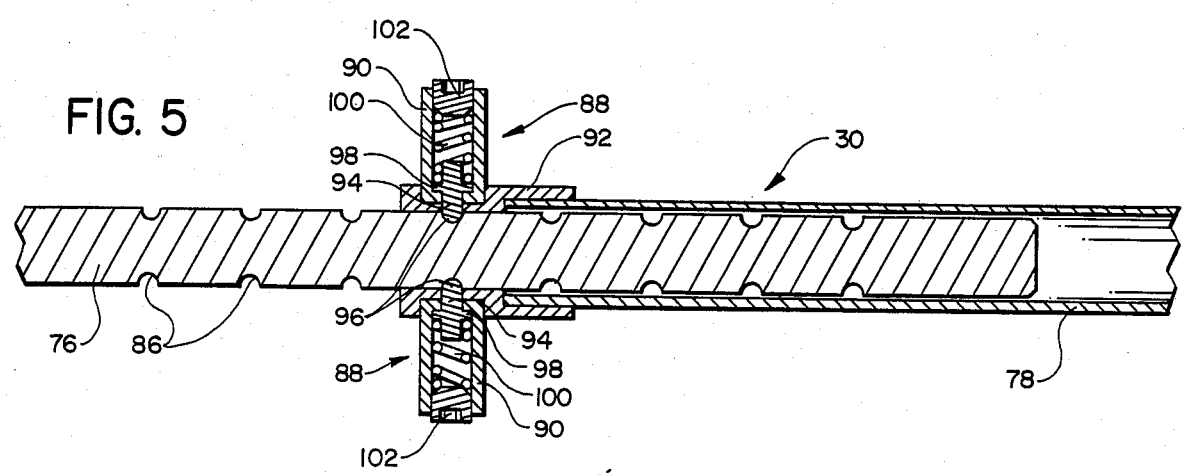
FIG. 5 is an enlarged, fragmentary, side sectional view of the rotatable joint of the connecting rod shown in FIG. 4.

The connecting rod 30, itself, is comprised of a first rod 76 and a tubular rod member 78 within which the rod 76 may project in telescoping relationship therewith. The ball joint means 32 associated with the first rod 76 is secured thereto by a fixture means 80 whereas that associated with the tubular rod 78 is secured by a corresponding fixture means 82. A releasable, rotatable joint designated generally as 84 provides cooperative engagement between the two rod members 76 and 78 in a way which permits for relative rotation therebetween, further accommodating any twisting forces applied to the connecting rod 30, while also permitting automatic length adjustment to accommodate longitudinal forces. This rotatable, releasable joint 84 is best viewed in detail in FIG. 5.

The rod 76 includes a series of circumferential grooves 86 formed periodically about the periphery thereof. The tubular rod 78 terminates in biased joint pin means, identified generally as 88, two of which are shown associated with the tubular rod 78 in FIG. 5. Each of the biased joint pin means is identical, and includes a housing 90 secured to a sleeve 92 at the end of the tubular rod 78. Each housing 90 includes a pin means 94 having a rounded distal end 96 and a circumferential flange 98 intermediate the length of the pin. The distal end of each pin 94 is configured for mating engagement within a selected one of the grooves 86, and is biased into such engagement by biasing means 100, shown in FIG. 5 to be a conventional coil spring. The spring is received within the housing 90 between the flange 98 and a removable cap 102.

When the connecting rod 30 is subjected to twisting (i.e., torsional) forces, the ball joint means 32 will accommodate the same up to the point where a "crimping" of the ball within the associated housing occurs. Beyond that, the tubular rod 78 is free for relative rotation with respect to the telescoping rod 76, with the pins 94 biased into engagement within a selected one of the grooves 86 and riding therein as the two members rotate relative to one another. Thus, these twisting forces are fully accommodated by the steering mechanism 20. However, it sometimes occurs that a longitudinal force will also be applied to the connecting rod 30. For example, the upward displacement of the main propulsion unit 14 vis-a-vis the auxiliary 16 may well alter the distance between the respective ball joint connectors as opposed to that when the main unit is in its lowered position. It may also sometimes occur that the propeller of one of the units will foul and give rise to a twisting tendency about a vertical axis which will be translated into either a compressional or tensional force within the connecting rod in excess of the tolerable amount of such a force between the two units. On the other hand, it is expected that steerage itself will result in certain acceptable levels of compressional and tensional forces within the rod which are required to be transmitted thereby. The releasable joint 84 is designed to tolerate the acceptable levels of these longitudinal forces but respond to excessive forces and adjust the length of the rod 30 automatically when such situations arise.

More specifically, by proper dimensioning of the depth of the grooves 86 and the biasing force on the projecting pin means 94—a matter well within the skill of the art—the biasing force itself will permit acceptable levels of longitudinal force to be transmitted across the joint; but, when such a longitudinal force becomes excessive, one of the faces of the preselected groove will bear on the rounded, distal end 96 of the pin 94 and displace it. Because the groove and mating pin have this arcuate geometry, the longitudinal force will be translated into a lateral force acting radially as respects the rod components and, hence, axially as respects the pin of the joint. In turn, this radial component of force will, once past the acceptable threshold, overcome the opposing biasing force provided by the spring 100. When that occurs the pin will be forced out of engagement with the groove 86 within which it formerly resided and an incremental length adjustment will occur to accommodate this excessive force. Thus, an automatic incremental adjustment is provided to the next adjacent groove. If that amount of adjustment is sufficient to accommodate the longitudinal force, the pin means 94 will be able to project within that next adjacent groove; but, if on the other hand, the longitudinal force compels a greater length adjustment, the tendency for any residence of the pin within the groove will be overcome in the same manner as aforesaid and a second incremental adjustment achieved. Eventually, however, the rod 76 will telescope within the tubular rod 78 to an appropriate extent and the coupling will be reestablished. In sum, therefore, both twisting and longitudinal forces are accommodated and effectively resolved in the improved steering mechanism of the present invention.

Figure 6:
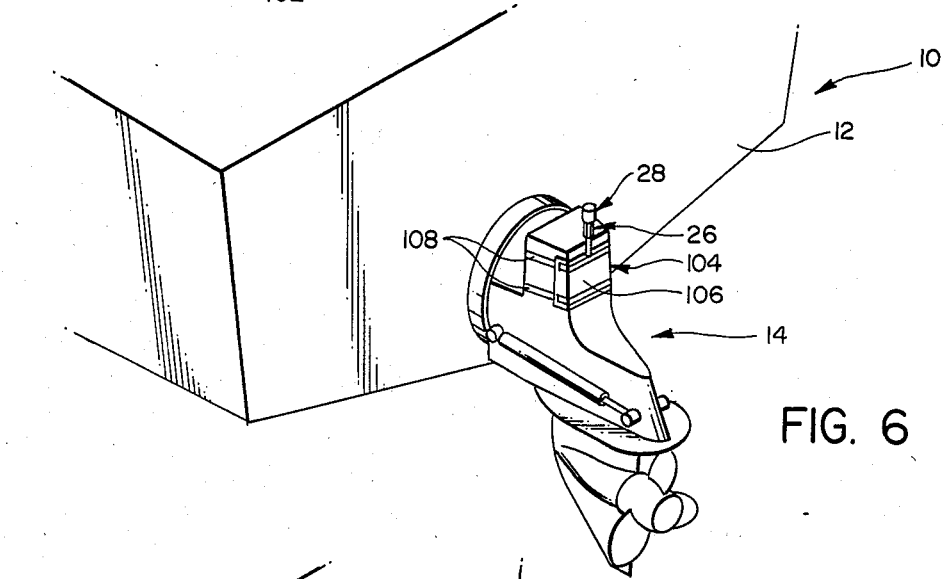
FIG. 6 is an isometric view of the transom of a boat having an outdrive equipped with an alternate type of bracket for association with a steering mechanism in accordance with the present invention.
Figure 7:
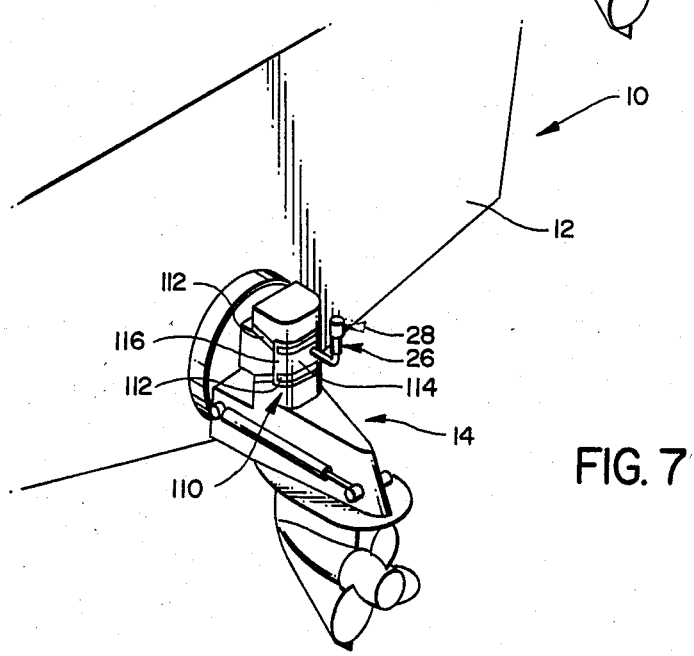
FIG. 7 is a view similar to FIG. 6 showing another alternate embodiment of a bracket means.

FIGS. 6 and 7 show the transom areas 12 of the boat 10, with the outdrive 14 only for the sake of clarity. In each of these figures, an alternate type of bracket for the steering mechanism is employed, and in each of which case the brackets are adaptations of those illustrated and described above in respect of FIG. 2. The bracket in FIG. 6, designated generally as 104 is comprised of a generally U-shaped channel member 106 like the channel member shown in FIG. 3. However, the bracket 104 is secured to the outdrive 14 by means of adjustable band means 108 like the adjustable band means 44 described above. The post means 26 in FIG. 6 includes the same type of generally upstanding pin structure terminating in the quick release fitting 28. In FIG. 7, the bracket, designated generally as 110, is likewise secured to the outdrive by means of adjustable bands 112. In this embodiment, however, the bracket includes a first web member 114 and side web means 116, one of which is shown, in articulated relationship with respect thereto. The band means 112 again serve to secure the bracket 110 to the outdrive and present the upstanding post means designated generally as 26 having the same type of configuration as the post means 26 shown in FIG. 2.

FIGS. 8 and 9 illustrate yet another alternate embodiment of a preferred type of bracket, designated generally as 118. Unlike those brackets heretofore described, the bracket 118 includes an adjustability feature in order to accommodate a different style of outdrive or in order to accommodate a wider variety of outdrive configurations.

The bracket 118 is comprised of a generally "U"-shaped web 120 having outwardly directed lips 122 at the distal free ends of the legs comprising that "U". Each of the lips 122 includes an aperture 124 for receiving an adjustable fastener 126, shown in this case to be a bolt. The bracket 118 also includes terminal clamp means 128 comprised of a central web member 130, an outwardly directed lip at the proximal end thereof and an inwardly directed lip 134 at the distal end thereof. The lip 132 includes an aperture 136 through which the fastening bolt means 126 may pass before receiving the associated nut. An upstanding post 26 like the one associated with bracket 24 is included from the central area of the "U" web 120 and terminates in the same type of quick release fitting 28 described above. The bracket 118 may be disposed over the outdrive 14, as shown in FIG. 8, and the bolts 126 tightened to cinch the lips 134 about the forward portion of the outdrive while the face of the "U" web 120 is secured into engagement with the rear face thereof, thereby affixing in a very positive sense the bracket 118 in association with the outdrive 14. Otherwise, the steering mechanism of FIG. 8 is the same as that described above in respect of FIG. 1.

FIG. 10 illustrates an alternate type of connecting rod, designated generally as 138. The rod 138 is the same as that disclosed in my earlier U.S. Pat. No. 4,311,471, and therefore warrants no detailed description herein. Suffice it to say that the rod 138 is comprised of first and second telescoping rod members 140 and 142 secured at a juncture 144 and terminating at ball joint means 32 like those described above. The rod 138 is capable of accommodating the same wide range of twisting motions; although it may not respond to longitudinal forces with an automatic, incremental length adjustment as is the case with respect to the connecting rod 30 described in detail above. For further details on the construction of the rod 138, reference is made to my previous patent. The disclosure of this form of connecting rod is made herein simply to show how the same may cooperate with the new forms of brackets described herein.

FIGS. 11-14 illustrate a boat 150 adapted specifically to receive an outboard motor 152 as the main propulsion unit and an outboard motor 154 as the auxiliary. Both outboard motors are secured to the transom 156 of the boat 150; the main unit 152 being disposed across the transom area through a recessed or notched area 158 thereof and the auxiliary 154 being secured directly to the transom by means of a pivotal bracket 160. The same type of connecting rod 30 joins the two motors in slaved steering engagement. The brackets secured to each motor may generally be of any design disclosed herein, but preferably the bracket associated with the auxiliary 154 is the same as shown in FIG. 2 and that associated with the main unit 152 is selected from those of FIGS. 2, 6, 7 and 9, depending upon the configuration of the shaft area of the motor.

Regardless of the bracket means used, FIGS. 11-14 show various spatial configurations for the two propulsion units. FIG. 11 shows both units in their lowered and operating positions, where the auxiliary is slaved for steerage by steering the main. FIG. 2 shows the main propulsion unit in its lowered, operating position but with the auxiliary in its raised and non-operating position. Although not in a configuration where the auxiliary can provide propulsion for the boat 150, the same may be left in slaved attachment with the main unit 152; thereby avoiding the inconvenience of removing the steering mechanism 20. FIG. 13 shows just the opposite orientation, where the main unit is raised to its non-operating position and the auxiliary is lowered to its operating position. Again, it can be seen that steerage of the main unit, even when in its non-operating position, nonetheless provides slaved steerage for the auxiliary. FIG. 14 shows both propulsion units in a raised position, which might be expected when transporting the boat 150 on a trailer or the like. Again, it can be seen that the steering mechanism 20 may be retained in place in this configuration thereby eliminating the inconvenience of disassembly for transportation.

FIGS. 11-14 also show how the length of the connecting rod 30 must be adjusted or adjustable in order to accommodate the four different configurations. By use of the automatically adjustable joint 84, this length adjustment is very easily made without the need to resort to the use of tools which may sometimes be an inconvenience.

While the invention has now been described with reference to certain preferred embodiments thereof, those skilled in the art will appreciate that various substitutions, modifications, changes, and omissions may be made without departing from the spirit thereof. Accordingly, it is intended that the scope of the present invention be limited solely by that of the claims granted herein.

What is claimed is:

1. A remote steering device adapted for use in a boat comprising:
  i. a main propulsion unit in operative engagement with a transom of said boat for rotation about a first axis between a first lower operating position and a second upper nonoperating position, said main propulsion unit being steerable from a cockpit portion of said boat;
  ii. an auxiliary outboard motor mounted externally of said boat to said transom for rotation about a second axis between a first lower operating position and a second upper nonoperating position; said remote steering device adapted for slaving attachment of said auxiliary outboard motor to said main unit in order to steer said auxiliary outboard motor from said cockpit portion of said boat by steering said main unit, said remote steering device comprising:
    a. a first bracket adapted to be mounted to said main unit;
    b. a first ball joint connected to said first bracket, said first ball joint having a first ball housing and a first ball member mounted in the first ball housing for rotation about three axes mutually perpendicular to one another;
    c. a second bracket adapted to be attached to said auxiliary outboard motor;
    d. a second ball joint connected to said second bracket, said second ball joint having a second ball housing and a second ball member mounted in the second ball housing for rotation about three axes mutually perpendicular to one another; and
    e. automatically adjustable connecting rod means connected between said two ball joints, said rod means comprising:
      1. a first tubular rod member having a first end connected to one of said ball joints and having a second end portion;
      2. a second rod member having a first end connected to another of said ball joints and a second end portion which extends into the second end portion of the first rod member in telescoping relationship, said second rod member being rotatably engaged by said first rod member for rotation about a lengthwise axis of said second rod member relative to said first rod member;
      3. the second end portion of the second rod member being formed with a plurality of arcuate grooves spaced from one another along the lengthwise axis of the second rod member, each of said grooves being positioned generally in a plane transverse to said lengthwise axis;
      4. biased pin means mounted in the second end portion of the first rod member to releasably engage the grooves of the second end portion of the second rod member, in a manner that when said pin means is engaging one of said grooves and a predetermined force exerted between said first and second rod members parallel to said lengthwise axis is exceeded, said pin means moves out of the groove which it is engaging to permit said second rod member to move axially relative to said first rod member so that said pin means comes into engagement with another of said grooves to provide an incremental length adjustment of said connecting rod means.

2. The remote steering device of claim 1, wherein said biased pin means in the second rod member is mounted for transversely reciprocable engagement within a selected one of said grooves.

3. The remote steering device of claim 2, wherein said pin means comprises at least one joint pin housing disposed proximate the second end portion of the first rod member and receiving a pin member and biasing spring means for applying a radially inward biasing force on said pin member the urging same into engagement within said groove.

4. The remote steering device of claim 1, wherein said first bracket is comprises of a generally U-shaped web supporting an upstanding post including a quick release fitting for receiving said first ball joint.

5. The remote steering device of claim 4, wherein said first bracket is an adjustable bracket, further comprising clamp means for engaging said main unit depending from free distal ends of said U-shaped web and secured thereto by adjustable fasteners.

6. The remote steering device of claim 5, wherein said free distal ends terminate in outwardly directed lip means having fixture apertures therein and wherein said clamp means include first outwardly directed lip means having fixture apertures therein and second inwardly directed lip means for engaging said main unit, and further wherein said adjustable fasteners comprise fixture bolts disposed through the fixture apertures in said outwardly directed lip means.

7. The remote steering device of claim 1, wherein said second bracket is comprised of a resiliently deformable web having a generally V-shaped configuration with a slightly rounded apex and a stiffening web secured thereto at said apex supporting an upstanding post including a quick release fitting for receiving said second ball joint.

8. The remote steering device of claim 7, wherein said second bracket further comprises adjustable band means disposed in an endless loop enveloping said deformable web for compressing the same into engagement with said auxiliary unit.

9. A connecting rod particularly adapted for a remote steering device adapted for use in a boat comprising:

i. a main propulsion unit in operative engagement with a transom of said boat for rotation about a first axis between a first lower operating position and a second upper nonoperating position, said main propulsion unit being steerable from a cockpit portion of said boat;

ii. an auxiliary outboard motor mounted externally of said boat to said transom for rotation about a second axis between a first lower operating portion and a second upper nonoperating position; and also where said remote steering device is adapted for slaving attachment of said auxiliary outboard motor to said main unit in order to steer said auxiliary outboard motor from said cockpit portion of said boat by steering said main unit, and said remote steering device comprises:

a. a first bracket adapted to be mounted to said main unit;

b. a first ball joint connected to said first bracket, said first ball joint having a first ball housing and a first ball member mounted in the first ball housing for rotation about three axes mutually perpendicular to one another;

c. a second bracket adapted to be attached to said auxiliary outboard motor;

d. a second ball joint connected to said second bracket, said second ball joint having a second ball housing and a second ball member mounted in the second ball housing for rotation about three axes mutually perpendicular to one another; and said connecting rod being an automatically adjustable connecting rod connected between said two ball joints, said rod comprising:

a. a first tubular rod member having a first end connected to one of said ball joints and having a second end portion;

b. a second rod member having a first end connected to another of said ball joints and a second end portion which extends into the second end portion of the first rod member in telescoping relationship, said second rod member being rotatably engaged by said first rod member for rotation about a lengthwise axis of said second rod member relative to said first rod member;

c. the second end portion of the second rod member being formed with a plurality of arcuate grooves spaced from one another along the lengthwise axis of the second rod member, each of said grooves being positioned generally in a plane transverse to said lengthwise axis;

d. biased pin means mounted in the second end portion of the first rod member to releasably engage the grooves of the second end portion of the second rod member, in a manner that when said pin means is engaging one of said grooves and a predetermined force exerted between said first and second rod members parallel to said lengthwise axis is exceeded, said pin means moves out of the groove which it is engaging to permit said second rod member to move axially relative to said first rod member so that said pin means comes into engagement with another of said grooves to provide an incremental length adjustment of said connecting rod means.

10. The connecting rod of claim 9, wherein said biased pin means in the second rod member is mounted for transversely reciprocable engagement within a selected one of said grooves.

11. The connecting rod of claim 10, wherein said pin means comprises at least one joint housing disposed proximate the second end portion of the first rod member and receiving a pin member and biasing spring means for applying a radially inward biasing force on said pin member then urging same into engagement within said groove.

* * * * *